United States Patent [19]

Briskman

[11] 3,825,837

[45] July 23, 1974

[54] TELEVISION RADIO FREQUENCY SWITCH

[75] Inventor: Robert David Briskman, Bethesda, Md.

[73] Assignee: Communications Satellite Corporation, Washington, D.C.

[22] Filed: June 1, 1972

[21] Appl. No.: 258,694

[52] U.S. Cl. ...... 325/456, 178/DIG. 6, 178/DIG. 13, 178/DIG. 15

[51] Int. Cl. ........................... H04b 1/06, H04n 5/44

[58] Field of Search. 178/DIG. 6, DIG. 13, DIG. 15; 325/456, 308

[56] References Cited

UNITED STATES PATENTS 3,702,898 11/1972 Webb ............................ 178/DIG. 6

3,707,597 12/1972 Lynn .................................. 325/456

*Primary Examiner*—Howard W. Britton

*Attorney, Agent, or Firm*—Sughrue, Rothwell, Mion, Zinn & Macpeak

[57] ABSTRACT

In a satellite ground station adapted to receive a plurality of television channels arriving, respectively, on different frequency carriers, a separate tuneable receiver is provided for each control center which is served by the ground station. When the tuneable receiver is switched in frequency, the first field sync pulse following receipt of a switching signal initiates a blank field which is placed at a d.c. level corresponding to the black level of the television picture. The succeeding field will be a complete field of the T.V. signal on the switched frequency.

8 Claims, 3 Drawing Figures

TELEVISION RADIO FREQUENCY SWITCH

BACKGROUND OF THE INVENTION

The present invention is particularly applicable to satellite retransmission of T.V. signals, and in particular, is concerned with the selection and switching of radio frequency modulated T. V. signals without causing transients or picture roll defined as the unintentional vertical movement of the picture on a television set's screen due to loss of field synchronization as a result of signal switching.

Presently, local control stations, e.g., a local T. V. studio, provide switching among several baseband T. V. signals. The switching may be between two cameras in the studio, or between a camera in the studio and the network T. V. signal received via cable or the like. The selected signal is then, of course, sent via the control station transmitting tower, to the home receivers. The system which performs the switching operates between field sync pulses and uses coaxial or other type switches to switch from one baseband to another.

There are a number of proposed systems for using satellites instead of cables, etc. for transporting television signals to local control stations. Some proposals include satellites for simultaneously retransmitting 24 T. V. channels which are frequency modulated, respectively, on carriers which are separated by 20 MHz.

Because of various factors, it is unlikely that any local control station will receive all its programs on only one of the 24 carrier frequencies. For example, failure in one of the satellite channels may preclude the use of one or more of the carrier frequencies. Also programs have to be varied to accomodate regional commercials and time zone changes. Other technical problems may occur which require switching from one carrier to another from time to time. Thus, to be flexible it is necessary that means be provided for enabling a local control station to receive the programs on any of the satellite frequency carriers.

SUMMARY OF THE INVENTION

Means are provided at a ground station for selectively receiving any of the satellite retransmitted carrier frequencies and transferring any selected T. V. signal to the local control stations served by the ground station. Switching between different carriers is accomplished at the ground station and is carried out without using 24 separate receivers and conventional baseband switching devices.

A substantial equipment savings is realized by using tuneable receivers, one for each control station served by the ground station. The switching is accomplished without losing any field sync pulses, often called the vertical synchronizing pulses. There will be virtually no perception of the actual switching, e.g. by seeing transients or streaks in the received picture or by seeing roll over of the picture. The switching takes place in less than one field interval and begins immediately following the first field sync pulse to arrive after a switch command occurs. The T. V. signal following said field sync pulse is blanked out for an entire field interval during which locally generated horizontal sync pulses will be sent to the local control station. The latter pulses are preferably placed at a d.c. level corresponding to the black level of the video signal. This results in a single black field, which is not perceptable to the average viewer, sandwiched between the last field of a former T. V. signal and the first field of a subsequent T. V. signal.

The blank interval prevents transients from appearing in the picture and prevents the occurrance of a field which is part of one T. V. signal and part of another T. V. signal.

DETAILED DESCRIPTION OF THE INVENTION

The invention herein will be described in connection with a domestic satellite system which is assumed to carry up to 24 television signals simultaneously. The 24 T. V. signals are field synchronized prior to transmission and are frequency modulated onto carriers $f_1$ thru $f_{24}$ which have a minimum separation of 20 MHz between adjacent carriers. The invention will also be described in connection with a ground station that serves a locality having only two control stations, i.e. two television stations in the area.

Figure 1:
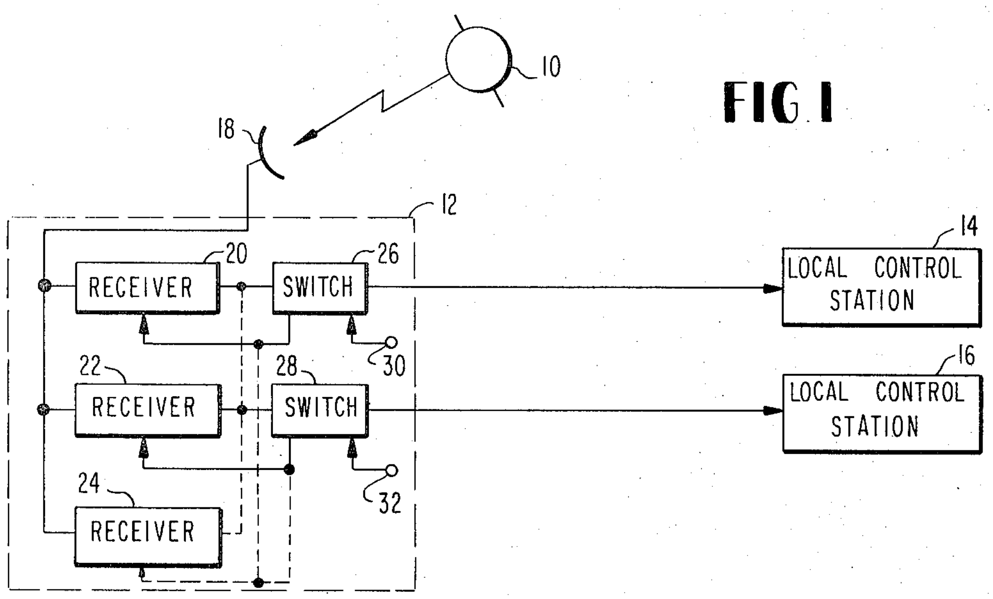
FIG. 1 is a block diagram showing the relationship between the receivers in a ground station and the local control stations.

As shown in FIG. 1, a satellite 10 retransmits 24 radio frequency modulated carriers, each carrying a different T. V. signal. The transmitting ground station or stations are shown and forms no part of the subject invention. The only requirement is that the switchable T. V. signals are field synchronized. The signals are relayed from the satellite to a plurality of ground stations throughout the area or country served by the overall system. One such ground station is shown generally at 12 and it is assumed that the ground station serves a locality having only two local stations 14 and 16.

Since the local station will not be receiving all its programming on only one of the carriers it is necessary to provide a switching between carriers. This, of course, could be done by providing twenty-four separately tuned receivers at the ground station plus a conventional baseband switching means for each local control station to select any of the 24 baseband outputs from the 24 receivers for transmission to the local control stations. However, a significant saving in equipment can be realized by using tuneable receivers, one for each local control station, and switching means for preventing transients and picture roll during switching from one frequency to another.

As shown in FIG. 1, the ground station 12 is provided with receivers 20 and 22, each of which is tuneable to the frequency of interest and which operates to detect and demodulate the selected signal to provide a T. V. baseband signal at its output. Suitable tuneable receivers, also referred to herein as detector/demodulators, are presently known and sold by a number of manufacturers. Each of the receivers is provided with a switching means, 26, 28 which responds to the channel selection control signals at 30 and 32, respectively, as will be more fully described hereinafter. The outputs from the respective switching means are transmitted by cables or the like to the local control stations 14 and 16. The ground station may comprise an additional receiver 24 just in case one of the receivers 20 and 22 are in need of repair.

Figure 2:
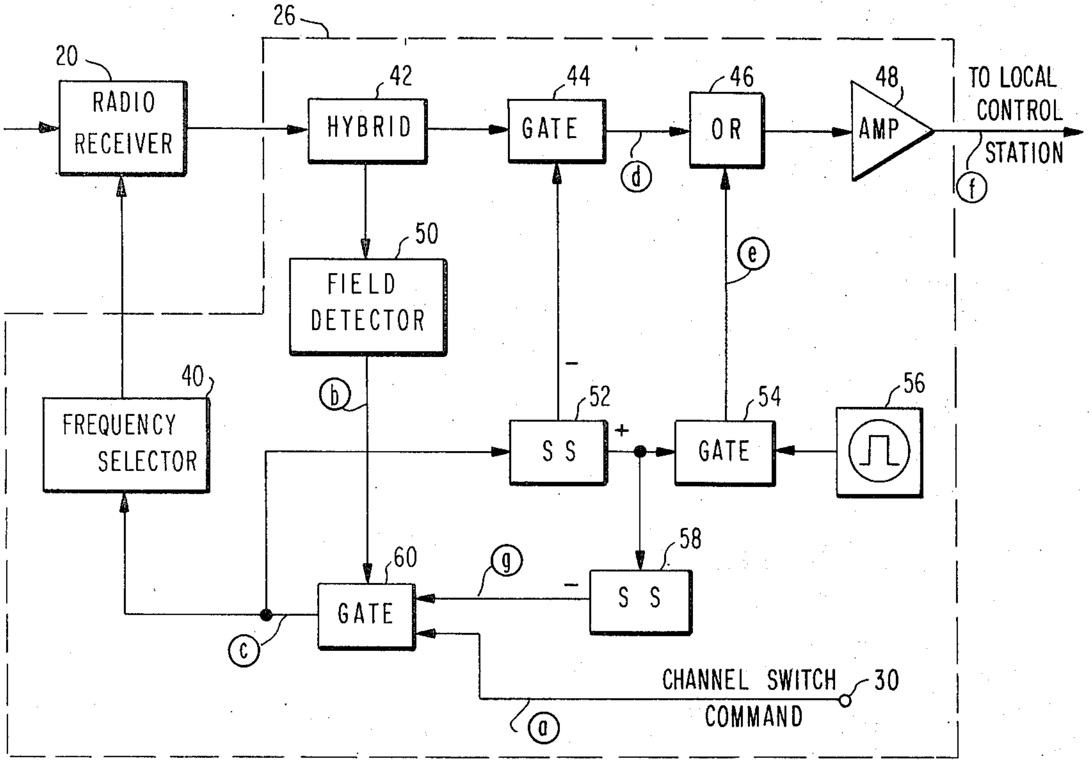
FIG. 2 is a block diagram of a receiver and switching apparatus in accordance with the present invention.
Figure 3:
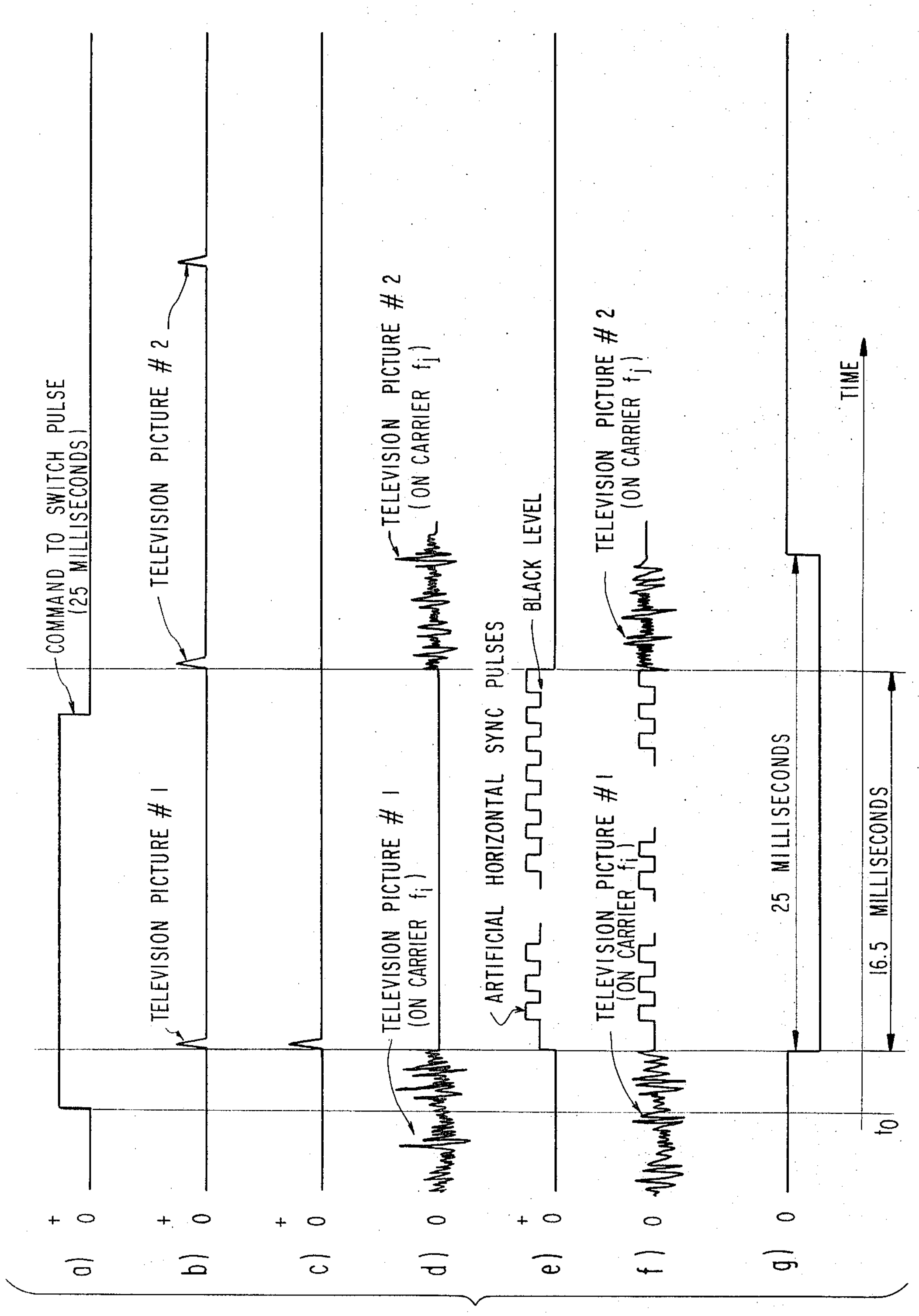
FIG. 3 illustrates several wave forms occurring at different locations in the switching apparatus.

Details of the switching arrangement will be described in reference to FIGS. 2 and 3, wherein the waveforms shown in FIG. 3 occur at locations in FIG. 2 which bear the same designation as the wave forms. It is assumed that the tuneable receiver 20 is initially tuned to receive the signals on carrier $f_i$ and that at some time $t_o$, a signal appearing at terminal 30 commands the receiver to be retuned to receive signals on carrier $f_j$. The particular form of the switch command signal or the origin thereof is not critical to the present invention. It may take any form compatible with conventional frequency selector 40 and tuneable receiver 20 to cause receiver 20 to be tuned to the desired channel. It is assumed herein that the command signal is a d.c. level signal lasting for approximately 25 milliseconds. It may originate from the local or from a remote control station, via a stored program, or may occur in response to the turning of a manual dial or switch at the ground station.

Under the assumed condition, prior to time $t_o$, the receiver 20 will demodulate the baseband on carrier $f_i$. The T. V. baseband signal output from receiver 20 will be applied to a hybrid circuit 42 which operates as a power splitter, sending a portion of the baseband to a field detector 50, and the major portion of the baseband to the local control station 14 via normally closed gate circuit 44, OR circuit 46, and baseband amplifier 48. Thus, the local control station will receive the T. V. baseband which arrived at the ground station modulated on the carrier $f_i$.

When the switch command signal appears at terminal 30, it is initially prevented from passing to the frequency selector 40 by the gate circuit 60. The purpose of gate circuit 60 is to insure that switching begins immediately succeeding a field sync pulse. The field detector 50, mentioned above, extracts the field sync pulses, often called the vertical synchronizing pulses, and applies them to gating circuit 60 to close the gating circuit. The command signal passes through the closed gate 60 and initiates frequency selector 40 which operates to tune receiver 20 to the frequency $f_j$. The retuning operation takes less than 16 milliseconds, which is approximately equal to the field interval. During the field interval in which tuning is taking place, the video at the receiver output is prevented from being sent to the local control station and a black level signal is sent instead.

The output from gate 60 triggers a single shot 52 which provides a negative and a positive 16.5 millisecond gating pulse. The duration of an NTSC television signal field is 16.6 milliseconds. The negative pulse is applied to gate 44 to block the baseband signal being sent to the control station for one field interval. The positive gating pulse is applied to gate 54 to close the latter gate and pass locally generated horizontal sync pulses from oscillator 56 to the local control station via OR circuit 46 and amplifier 48. The d.c. level of the signal including the local horizontal sync pulses is preferably at the black video level. This is because a single black field is less perceptable than a white field.

The positive output from single shot 52 also triggers single shot 58 which, in turn, provides a 25 millisecond negative pulse to gate 60. The latter pulse opens gate 60 to prevent erroneous multiple inputs. Since the switching is initiated immediately after a field sync pulse and takes less than a full field interval, no field sync pulses are lost and picture roll is thereby prevented.

What is claimed is:

1. A system for switching between two T. V. baseband signals modulated respectively on first and second frequencies comprising, a. tuneable receiver means of the type which can be tuned to said first and second frequencies for receiving, detecting, and demodulating the T. V. baseband signal modulated onto the tuned frequency, b. an output circuit for passing said demodulated T. V. baseband to the output of said switching system, c. means responsive to the first field sync signal of said demodulated T. V. baseband signal occurring after the initiation of a channel switch command signal for initiating tuning of said receiver to the one of said first and second frequencies other than the one to which it is presently tuned, and d. means, responsive to said last mentioned means for substituting during the entire T. V. field interval following said first field sync pulse, locally generated horizontal sync pulses raised to a d.c. level corresponding to the T. V. black level in place of the T. V. baseband signal output from said receiver.

2. A switching system as claimed in claim 1 wherein said output circuit comprises, a. an output terminal adapted to be connected to a local control station, b. an OR circuit, and c. a normally closed gating circuit, said output terminal, said OR circuit and said gating circuit being connected in series with the output of said receiver whereby the T. V. baseband signal passes through said gating circuit then through said OR circuit to said output terminal.

3. A switching system as claimed in claim 2 wherein said means responsive to the first field syne signal comprises, a. a second gating circuit connected between a command signal input terminal and said receiver for passing a command signal at said input terminal to said receiver when said second gating circuit is closed, said gating circuit having two additional input terminals, whereby said gating circuit is closed by logic signals applied to said two additional input terminals, b. a first single shot multivibrator having an input and an output, said output being connected to one of the additional inputs of said second gate and being normally at a logic level to close said second gate, and c. means responsive to the field sync signals in the receiver output for applying a logic signal to the second additional input of said second gating circuit to close said gate in time coincidence with the occurrence of said field sync signals.

4. A switching system as claimed in claim 3 wherein said means for substituting comprises, a. oscillator means for generating a output signal consisting of a series of pulses at a d.c. level corresponding to the T. V. black level and having a pulse frequency equal to the horizontal line rate of the T. V. signal, b. third gating means connected between the output of said oscillator means and an input to said OR circuit and being adapted when closed by a logic signal applied to a second input thereof to gate said oscillator output signal therethrough to said OR circuit, and c. second single shot multivibrator means responsive to the signal passing through said second gating means when the latter is closed for blocking the first mentioned gating means for an interval equal to a field interval and for applying a logic signal to the second input of said third gating means for said interval.

5. A ground station for a satellite communications system adapted to relay to said ground station a plurality of T. V. signals modulated respectively on a plurality of carrier frequencies, said ground station comprising, a. at least one frequency tuneable detector/-demodulator for each local control station in the region served by said ground station, each said frequency tuneable detector/demodulator being adapted to be tuned to select the T. V. signal on any of said plurality of carrier frequencies and to provide the T. V. baseband signal at its output, and b. separate radio frequency switching means associated with each detector/demodulator for controlling switching of said detector/demodulators from one T. V. signal to another T. V. signal, each said radio frequency switching means comprising, i. an output circuit for passing the demodulated T. V. baseband signal at the detector/demodulator output to the associated local control station, ii. means responsive to the first field sync signal of the demodulated T. V. baseband signal occurring after the initiation of a channel switch command signal for initiating tuning of said detector/-demodulator to a frequency different than its present tuned frequency, whereby the detector/-demodulator will provide a different T. V. baseband signal at its output when it becomes fully tuned to the new frequency, and iii. means responsive to said last mentioned means for substituting during the entire T. V. field interval following said first field sync pulse, locally generated horizontal sync pulses raised to a d.c. level corresponding to the T. V. black level in place of the T. V. baseband signal output from said detector/demodulator.

6. A ground station as claimed in claim 5 wherein said output circuit comprises, a. an output terminal adapted to be connected to a local control station, b. an OR circuit, and c. a normally closed gating circuit, said output terminal, said OR circuit and said gating circuit being connected in series with the output of said detector/demodulator whereby the T. V. baseband signal passes through said gating circuit then through said OR circuit to said output terminal.

7. A ground station as claimed in claim 6 wherein said means responsive to the first field sync signal comprises, a. a second gating circuit connected between a command signal input terminal and said detector/-demodulator for passing a command signal at said input terminal to said detector/demodulator when said second gating circuit is closed, said gating circuit having two additional input terminals, whereby said gating circuit is closed by logic signals applied to said two additional input terminals, b. a first single shot multivibrator having an input and an output, said output being connected to one of the additional inputs of said second gate and being normally at a logic level to close said second gate, and c. means responsive to the field sync signals in the detector/demodulator output for applying a logic signal to the second additional input of said second gating circuit to close said gate in time coincidence with the occurrence of said field sync signals.

8. A ground station as claimed in claim 7 wherein said means for substituting comprises, a. oscillator means for generating an output signal consisting of a series of pulses at a d.c. level corresponding to the T. V. black level and having a pulse frequency equal to the horizontal line rate of the T. V. signal, b. third gating means connected between the output of said oscillator means and an input to said OR circuit and being adapted when closed by a logic signal applied to a second input thereof to gate said oscillator output signal therethrough to said OR circuit, and c. second single shot multivibrator means responsive to the signal passing through said second gating means when the latter is closed for blocking the first mentioned gating means for an interval equal to a field interval and for applying a logic signal to the second input of said third gating means for said interval.

* * * * *